United States Patent Office 3,826,614
Patented July 30, 1974

3,826,614
TOTAL MERCURY MONITOR
Italo A. Capuano, Orange, Conn., assignor to Ionics, Incorporated, Watertown, Mass.
Continuation-in-part of applications Ser. No. 75,927, Sept. 28, 1970, now Patent No. 3,713,776, and Ser. No. 115,175, Feb. 16, 1971, now Patent No. 3,704,097. This application May 17, 1972, Ser. No. 254,251
Int. Cl. G01n 21/26, 31/10, 33/18
U.S. Cl. 23—230 R                    14 Claims

ABSTRACT OF THE DISCLOSURE

Apparatus and method are provided for analyzing liquid streams for their content of mercury including elemental mercury, ionic mercury and undissociated mercury compounds such as phenyl mercury and methyl mercury. The sample is automatically measured and first treated with an acidic metal salt reagent containing an oxidant for oxidizing elementary mercury in the sample to ionic mercury and then with hydrazine to form a suitable catalytic colloid. Elementary mercury is then formed by the action of hydrazine and the catalytic colloid on the ionic and combined mercury and is transferred to a photometric detector. The results are indicated and/or recorded automatically, accurately and rapidly. The apparatus and method are especially useful in the control of mercury contamination in the environment and also for monitoring chemical process streams.

---

Figure 1:
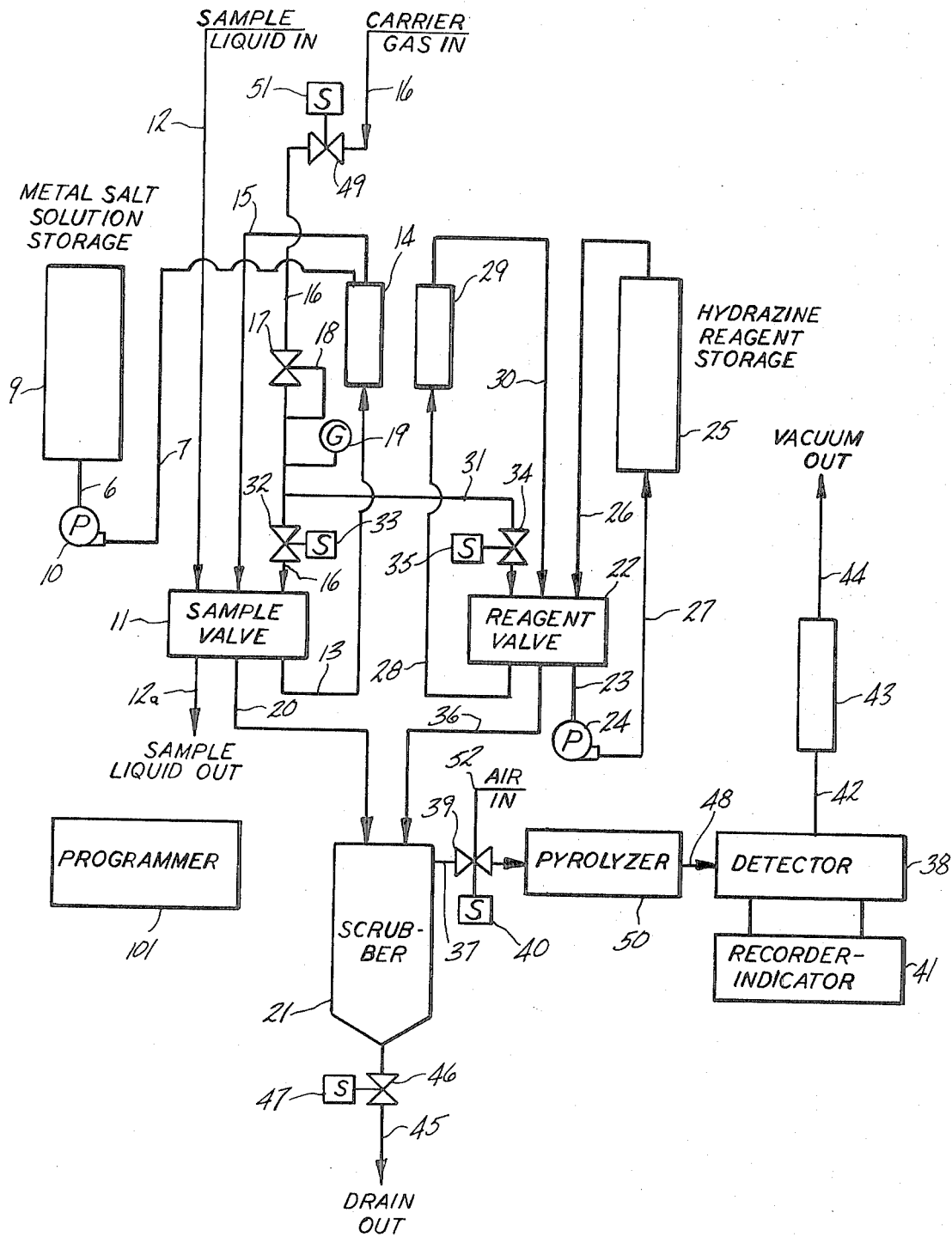

This invention relates to a method and apparatus for applications Ser. No. 75,927 filed Sept. 28, 1970, now U.S. Pat. No. 3,713,776, issued Jan. 30, 1973 and Ser. No. 115,175, filed Feb. 16, 1971, now U.S. Pat. No. 3,704,-097, issued Nov. 28, 1972.

This invention relates to a method and apparatus for continuous, automatic analysis of a liquid for its content of mercury. The liquids are suitably aqueous, either a flowing stream or in discrete portions. The mercury is suitably in the form of elemental mercury, ionic mercury of any kind and undissociated mercury in organic compounds, for example, methyl mercury and phenyl mercury. All of these are rapidly reduced by aqueous hydrazine under the catalytic action of a colloidal metal oxide catalyst. The colloidal contact catalyst is suitably a metal oxide formed by the action of hydrazine on a metal salt which is effective with hydrazine to convert ionic or undissociated mercury to metallic mercury. The oxides here referred to may be more or less hydrated oxides or hydroxides. The colloidal catalysts prepared as described herein do not appear to be the metal sols described by Weiser, "Inorganic Colloid Chemistry," Vol. 1, p. 138 (1933). It is important that the colloid is not a metal which amalgamates with mercury, for example, copper or silver. Colloidal silver, formed by reaction of hydrazine with a solution of silver salt, amalgamates with mercury and consequently interferes with the mercury determination by the apparatus and method of this invention.

Aqueous liquids have previously been analyzed manually for ionic and organic mercury by reducing with hydrazine and colloidal copper metal with subsequent oxidation of the solution containing the resulting copper amalgam with sulfuric acid and potassium permanganate reagent and finally titrating with dithizone. See Nobel et al., Clinical Chemistry, 4, No. 2, pp. 150–158 (1958).

Also, ionic mercury in liquids has been manually analyzed by reduction with acidic stannous chloride, vaporizing the mercury and measuring photometrically the intensity of its 2537 Angstrom units spectral line. See Dill, U.S. Atomic Energy Commission, Report Y-1572, issued Mar. 28, 1967 and Rathje, American Hygiene Association Journal 30, 126–132 (1969).

The method and apparatus of this invention is useful for determining automatically the mercury in aqueous streams that may be discharged to underground storage or to surface drainage. Mercury contaminated streams originate in locations where mercury or its compounds are used in manufacturing various products, for example, in chlor-alkali plants operating mercury cells, felt manufacturing plants, plants for manufacturing mercury-containing pesticides, instruments, lamps, batteries and medicinals.

A major difficulty in controlling mercury contamination of the environment in industrial areas has been the lack of automatic methods and apparatus capable of analyzing for mercury quickly, accurately and continuously. Some proposed methods and apparatus are not suited for use in contaminated environments where, for example, chlorine gas adversely affects the function and structure of the apparatus or where other contaminants lead to false results. When mercury, as a contaminant, is present as the element or as salts, for example, as chloride salts, methods and apparatus employing pyrolytic reduction do not accurately respond to such mercury chloride salts. Because mercury is frequently present in various forms, fluid samples cannot give accurate analyses when passed directly into many of the devices available for mercury analysis. This difficulty is overcome according to the present invention by converting the various forms of mercury to elementary mercury chemically and measuring its amount using instruments highly sensitive to the vapor of elementary mercury. The method and apparatus of the present invention are useful and accurate for analysis of samples containing other contaminants, particularly elemental or available chlorine.

The method and apparatus of this invention removes and measures a finite sample of the liquid to be analyzed and processes the sample automatically to the finally indicated and/or recorded result. The sample is suitably removed and measured from a supply which may be moving or quiescent, i.e., it may be a flowing stream or a stationary body of liquid brought to the place of analysis. It is, however, a feature of the apparatus of the present invention, that it is portable and is suitably transported to the place where the liquid to be analyzed is located. Advantageously, the sample points used in conjunction with the method and apparatus of this invention are located sufficiently upstream of a disposal point to permit remedial steps to be taken to correct contamination before discharge of the stream under test when the method of this invention indicates the necessity of such action.

Mercury in the fluids analyzed is determined accurately and quickly by the method and apparatus of this invention when the mercury is present as one or more of the entities, $Hg^0$, $Hg^{+1}$, $Hg^{+2}$ or undissociated mercury organic compounds, for example, methyl mercury and phenyl mercury. The entity $Hg^0$ represents elemental mercury. It is sometimes present as liquid mercury usually dispersed or emulsified as droplets in aqueous liquids. The entity $Hg^{+1}$ represents monovalent ionic mercury usually present in aqueous liquids as dissolved or suspended salts of mercurous mercury. The entity $Hg^{+2}$ represents divalent ionic mercury usually present in aqueous liquids as dissolved or suspended salts of mercuric mercury. Undissociated mercury organic compounds are usually dissolved or suspended in aqueous liquids.

This application is directed to a modification of the method and apparatus disclosed and claimed in the parent application and is particularly advantageous where the sample for analysis contains elementary mercury in the form of particles of various sizes. Larger particles vaporize less rapidly than smaller particles in the vaporization step of the process. In the present modification, this variation is avoided by first oxidizing elementary mercury in the sample to ionic mercury using a suitable oxidant. Subsequent reduction to elementary mercury by hydrazine in the presence of colloidal metal oxide catalyst produces particles of elementary mercury of such uniform size that vaporization is substantially complete at a uniform rate.

Included in the metal salt reagent solution is a minor amount of a soluble oxidant for the oxidation of elementary mercury. Suitable oxidants are those known to effectively oxidize elementary to ionic mercury, for example, permanganates, peroxides, nitric acid and persulfates. Minor amounts of mineral acid are also included in the metal salt reagent solution to enhance the action of the oxidant. Sulfuric acid in conjunction with persulfates or permanganates is especially suitable. Nitric acid alone serves advantageously both as oxidant and acidifying agent. The acid has the further function in insuring that elementary mercury is not adherent to the walls of the transfer lines and valves and is quantitatively transferred to the scrubbing and vaporizing zone.

As oxidants, alkali metal permanganates, peroxides and persulfates are suitable. Potassium persulfate is most readily available and preferred.

Mercury thus converted to ionic form and mercury present in organic compounds is reduced to the metallic state by aqueous hydrazine in the presence of a colloidal titanium oxide, nickel oxide or copper oxide contact catalyst and analyzed according to the method of this invention.

The method and apparatus of this invention are also suitably used to measure the effectiveness of operation of mercury-removing or mercury-introducing machines, processes and systems by measuring the mercury content of input and output streams.

The method of the present invention automatically monitors a liquid for the total content of mercury when it is present therein as at least one of the entities, $Hg^0$, $Hg^{+1}$, $Hg^{+2}$ and undissociated mercury compounds by programming and mechanically performing successively and repetitively the operation of:

(a) providing aqueous hydrazine reagent in a first reagent storage zone and an acidic metal salt solution containing dissolved oxidant for elementary mercury in a second reagent storage zone;

(b) removing from said reagent storage zone a hydrazine reagent portion of predetermined amount and transferring said hydrazine reagent portion to a scrubbing zone;

(c) scrubbing said hydrazine reagent portion in said scrubbing zone with a gaseous carrier;

(d) separating said gaseous carrier from the resulting aqueous mixture in said scrubbing zone;

(e) transferring said carrier to a pyrolyzing zone and pyrolyzing said carrier and admixed components to remove interfering material from said gaseous carrier;

(f) transferring said carrier to a measuring zone and automatically adjusting the base line reading to zero;

(g) providing a fluid to be monitored for mercury therein;

(h) removing from said fluid a sample of predetermined amount in a sample measuring zone;

(i) removing from said second reagent storage zone a metal salt and oxidant reagent portion of predetermined amount and mixing said metal salt and oxidant reagent portion with said sample in said sample measuring zone;

(j) transferring the thus measured and treated sample to said scrubbing zone;

(k) scrubbing the resulting mixture of said sample with said aqueous mixture in said scrubbing zone with said carrier;

(l) separating said gaseous carrier from the resulting aqueous liquid in said scrubbing zone;

(m) transferring said carrier to said pyrolyzing zone and pyrolyzing said carrier and admixed components to remove interfering material from said gaseous carrier;

(n) transferring said carrier to said measuring zone and photometrically measuring the quantity of mercury in said carrier;

(o) indicating the quantity of mercury in said carrier relative to the predetermined amount of said sample.

Apparatus suitable for use in carrying out the process of the present invention has means including:

(a) programming means for mechanically activating and deactivating successively and repetitively;

(b) means for removing from a fluid a sample of predetermined amount in a sample measuring zone and means for transferring the thus measured sample to a scrubbing zone;

(c) means for transferring a predetermined amount of acidic metal salt reagent containing dissolved oxidant from a storage zone therefor to said sample measuring zone;

(d) means for circulating aqueous hydrazine reagent cyclically from a reagent storage zone through a reagent valve and through a reagent measuring zone and return to said reagent storage zone;

(e) means for removing from said circulating hydrazine reagent a predetermined amount of said hydrazine reagent and for transferring said amount of hydrazine reagent to said scrubbing zone;

(f) means for scrubbing the mixture in said scrubbing zone with a gaseous carrier;

(g) means for separating said gaseous carrier containing mercury vapor from the resulting aqueous liquid in said scrubbing zone;

(h) means for transferring said carrier containing mercury vapor to a pyrolyzing zone to remove interfering materials from said gaseous carrier;

(i) means for transferring the resulting purified gaseous carrier containing mercury vapor to a measuring zone;

(j) photometric means for measuring the quantity of mercury in said carrier;

(k) means for indicating the quantity of mercury in said carrier relative to the predetermined amount of said sample.

CALIBRATION

Suitably, mercury-free gas carrier and aqueous liquid standards containing known amounts of mercury are introduced and analyzed to calibrate the system. Care must be exercised to avoid the introduction of carrier gas containing unknown or variable amounts of mercury which would affect the determination. Mercury-free carrier gas is suitably provided from a source of pure, compressed gas, advantageously from a cylinder of compressed gas. Alternatively, air is suitably brought to the apparatus from a remote uncontaminated location. The inert gaseous carrier is suitably air, nitrogen, hydrogen, helium, argon or other gases inert to aqueous hydrazine and catalyst and non-absorbing in the ultraviolet region.

Suitable and preferred aqueous hydrazine reagent is a 10 percent solution. However, the composition of the aqueous hydrazine reagent is not critical between 2 to 35 percent. The aqueous metal salt solution is suitably about 0.5 percent; however, its concentration is not critical and may be suitably between 0.05 and 5 percent. Suitable metal salts are reduced by hydrazine to colloidal metal oxides effective to convert ionic or undissolved mercury to metallic mercury. Suitable oxides are nonbasic and include copper, nickel and titanium oxides. Preferred salts are the halides, sulfates and nitrates of cupric copper, nickel and titanous titanium.

The acidic aqueous metal salt solution also contains an oxidant, for example, a persulfate, suitably an alkali metal persulfate and preferably potassium persulfate suitably in an amount of about 3 percent; however, the concentration of the oxidant is not critical and may suitably be between 0.05 and 5 percent. The aqueous metal salt solution also contains a minor amount of mineral acid, suitably sulfuric or nitric acid, in an amount of about 2 percent; it is also not critical and may suitably be between 0.05 and 5 percent.

It is important that the mercury content, if any, of the metal salt reagent, also containing the oxidant and acid, be predetermined and that a suitable correction factor be applied to the measured content of mercury in the sample. The predetermination is suitably performed by analysis using the method and apparatus here disclosed and claimed or by any suitable preliminary manual analysis. Preferably, by the use of pure reagents, the mercury content of the reagent is negligible.

At start-up, a measured amount of aqueous hydrazine reagent is transferred to a suitable scrubber. Mercury-free carrier is bubbled through the liquid at a constant rate and is transferred through the pyrolyzer to the detector. The detector is then automatically zeroed by a servomechanism under the control of the programmer. The liquid sample containing mercury is then introduced and analyzed.

ANALYSIS OF SAMPLE

The liquid sample suitably flows continuously through the sampling and measuring means. When the detector has been automatically zeroed, using the aqueous hydrazine reagent as described above, a measured sample is removed from the flowing stream in the sample measuring zone, a predetermined amount of metal salt solution containing oxidant is injected into the sample in the sample measuring zone where elementary mercury is oxidized to ionic mercury. The thus measured and treated sample is then transferred to the scrubber and mixed with the hydrazine reagent in the scrubber. Mercury in any form in the sample is converted substantially instantaneously to elemental mercury. The stream of carrier gas transporting the mercury vapor passes through a high temperature pyrolyzer where it is heated to about 500° to 1200° C. to remove possible interfering materials vaporized from the sample and then passes through a photometric analyzer and out, suitably under the influence of reduced pressure. The analysis is indicated by the detector and is suitably recorded. A plurality of liquid sample points are suitably selected serially by programmer and analyzed. Each analysis requires about 6 minutes and each analysis uses fresh portions of aqueous hydrazine reagent and metal salt solution.

APPARATUS

The measurement and flow of sample, carrier gas and reagent are directed by any suitable programmer-operated valve having a suitable number of ports. One commercially available valve suitable for use as sample valve and reagent valve in the apparatus of this invention is the LG-6 sliding insert valve No. W 122437 of Beckman Instruments, Inc., but any other suitable valve will serve. Advantageously, such valves are fabricated of "Kel-F" or other suitable plastic parts and the ports and other fluid-carrying passages are lined with plastic. These valves suitably have a plurality of ports sufficient to perform the functions desired and may be from 2 to 10. The 6-port valves are suitable for sample and reagent valves in the apparatus of the present invention. Other valves in the system usually have 2 or 3 ports.

An injector pump capable of transferring a predetermined portion of metal salt solution into the system is used but any other suitable means can be used for this purpose. A high temperature furnace with a suitable tube is used to remove interfering materials, particularly organics, from the vapor. The tube is advantageously, though not necessarily, a tube of silica.

A terminal vacuum is generated and applied to induce the flow of gaseous carrier through the system. The vacuum generator is under control of the programmer and is activated when analyses begin and continues to operate until no further analyses are to be made. Suitably an exit pressure of 740±10 mm. is maintained when the apparatus and inlet lines are at sea level atmospheric pressure and generally at pressures of about 10 to 30 mm. below inlet pressures. Positive pressure instead of vacuum can also be employed to move the gaseous carrier through the system.

DETECTOR

One suitable detector is the DuPont 400 photometric analyzer which is suitable for use with standard millivolt, self-balancing recorders having unbalanced impedance over 10,000 ohms. Analyzer output impedance is up to 20,000 ohms. Power at 110 volts and 60 Hertz is supplied. A suitable recorder is Leeds and Northup Speedomax H with a range of 0 to 10 millivolts. Other suitable instruments are available.

The preferred detector has an ultraviolet light generator at one end which illuminates a one-meter tube through which carrier gas passes. Mercury vapor in the gas absorbs the 2537 Angstrom unit wave length and reduces the intensity of the light at the other end of the tube where a photocell is located. The current passing through the photocell is inversely proportional to the amount of mercury vapor in the tube.

PROGRAMMER

Any suitable programmer is useful in the method and apparatus of this invention. Advantageously, the programmer incorporates selector means whereby any of a plurality of sample sources are activated to provide a sample for analysis according to the method of this invention. Suitably the programmer is a timer adapted to close and open circuits in sequence for selected periods of time, to activate and shut down the vacuum terminally applied to the system, to activate and shut down the aqueous reagent and metal salt solution pumps, to open and close valves which permit the flow of measured amounts of reagents, sample and, when desired, inert diluent gas through the system and to activate and shut down the detector and recorder-indicator. Programmers are commercially available which are suitably adjustable to provide the desired sequence of operations. One suitable programmer is No. 520 manufactured by Beckman Instruments, Inc. but other commercial devices are suitable.

DRAWINGS

FIG. 1 illustrates a system of the invention capable of analyzing liquids. FIG. 1 shows chemical flow lines but omits electrical lines shown in FIG. 2.

Figure 2:
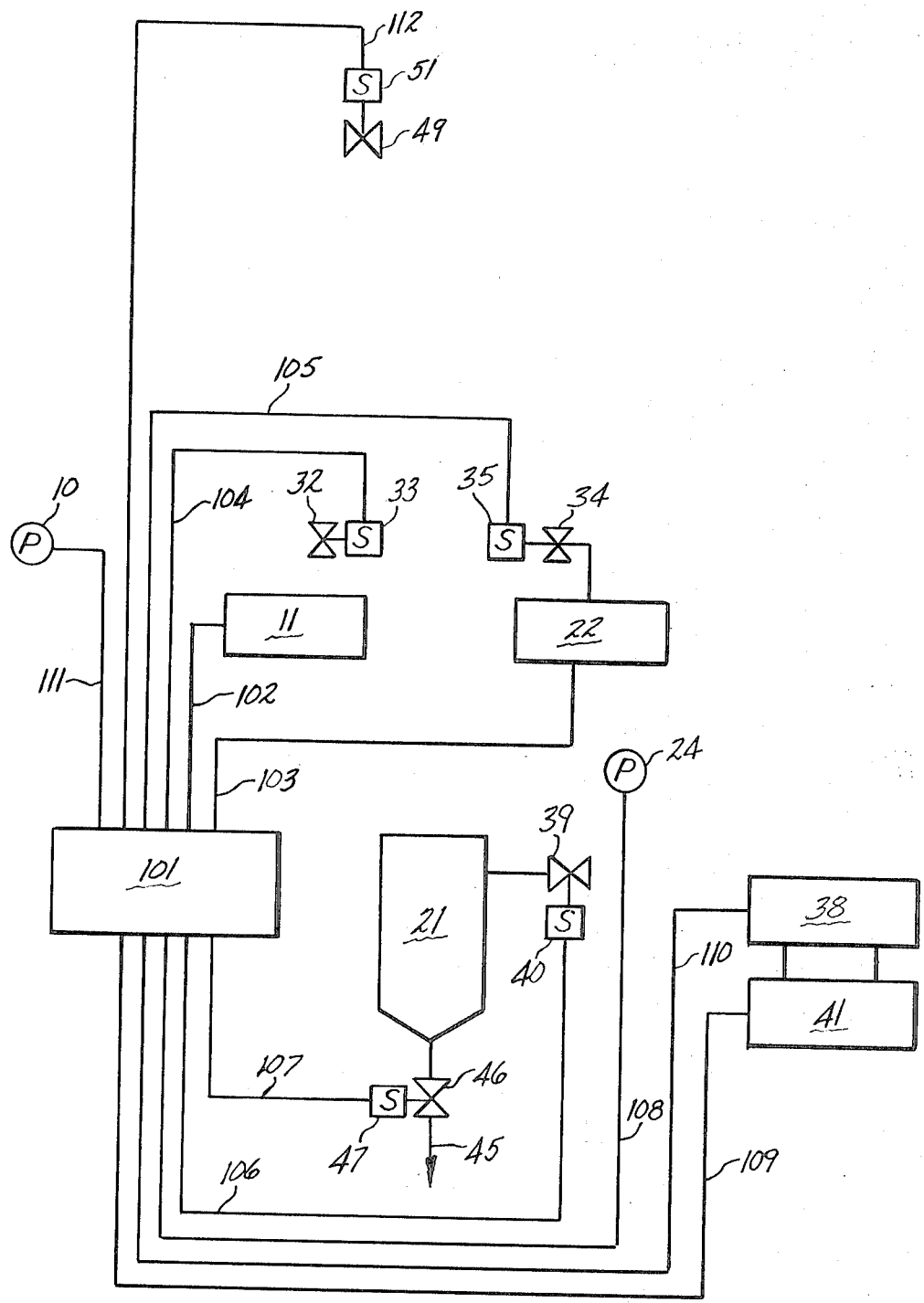

In FIGS. 1 and 2, line 16 is provided for introducing carrier gas into the system through valve 49, operated by solenoid 51 under control of programmer 101 via line 112. Sufficient vacuum is applied via line 44 to draw the carrier gas through the entire system. The carrier gas is transferred via line 6 controlled by the pressure regulator consisting of valve 17 and line 18 under the pressure indicated by gage 19 and through valve 32 operated by programmer 101 using line 104 to solenoid 33. Sample valve 11 is activated by programmer 101 via line 102 to permit flow of carrier gas from line 16 through line 20 to scrubber 21.

While gaseous carrier is flowing through the system, pump 24 normally circulates aqueous hydazine reagent from reagent storage 25 to reagent valve 22 via line 26, through measuring device 29 via lines 28 and 30 and back to reagent storage 25 via lines 23 and 27. Programmer 101 operates via line 103 to shut down pump 24 and reagent valve 22 is operated to withdraw carrier gas from line 31 into line 28. Flow of air in line 31 is regulated by valve 34 operated by solenoid 35 under control of programmer 101 via line 105. Carrier gas and the measured quantity of aqueous hydrazine reagent is transferred via line 36 to scrubber 21.

Simultaneously with the operation of valve 22, as described, injector pump 10 is activated by programmer 101 via line 111 to admit a predetermined amount of metal salt solution containing oxidant from storage 9 via lines 6 and 7 into sample measuring device 14. After a suitable time of 0.1 to 3 minutes or more, the sample contains all the mercury in ionic form and is transferred via sample valve 11 and line 20 into scrubber 21.

In scrubber 21, the gas is separated from the aqueous portion and transferred via line 37 to pyrolyzer 50. This transfer is controlled by valve 39 operated by solenoid 40 programmed by programmer 101 via line 106. The pyrolyzed carrier gas passes via line 48 to detector 38. Detector 38 indicates the amount of mercury, if any, in the gaseous carrier and advantageously records the result by means of connected recorder-indicator 41. Detector 38 operates on a flow of gas, which is exhausted via line 42 through flowmeter 43 under the influence of vacuum applied via line 44. By means of the above-described procedure, a blank is established on the reagents and gaseous carrier and the detector is auto-zeroed. Programmer 101 operates valve 39 to shut off the vacuum and admit air via line 52. Programmer 101 then energises solenoid 47 via line 107 and opens valve 46, whereby the aqueous mixture is discharged via line 45 and the system is ready for analysis of samples.

In analyzing liquids, gaseous carrier flow is continued through the system, aqueous hydrazine reagent is circulated and measured and metal salt solution is injected as described above. The liquid to be analyzed is introduced via line 12, flows via line 13 through sample measuring device 14 and returns via line 15 to sample valve 11 and discharges via line 12a. Operation of sample valve 11 directs the flow of liquid from line 12 to line 12a. Valve 11 is operated to cut off a measured sample of the liquid in measuring device 14 and associated lines, injector pump 10 is activated by programmer 101 via line 111 to admit a predetermined amount of metal salt solution containing oxidant from storage 9 via lines 6 and 7 into sample measuring device 14. After oxidation of elementary mercury in the sample to ionic mercury, valve 11 is operated to transfer the measured and thus treated sample via line 10 to scrubber 21. Pyrolysis, detection and recording are continued as described above. The analysis, from time of sampling to time of indicating the result, requires about 6 minutes. In preparation for the next analysis, the aqueous liquid in scrubber 21 is discharged via line 45 by the procedure described above. Because the liquid sample is mixed with the aqueous hydrazine reagent and catalyst, each analysis of liquid sample requires a fresh charge of aqueous hydrazine reagent and of metal salt solution.

Example I

A system as shown in FIGS. 1 and 2 was set up using a DuPont 400 photometric analyzer with a 1-meter cell. Samples of water containing 100 p.p.b. (parts per billion) of elemental mercury were analyzed as described using air carrier flow of 1.5 liters per minute, 10 ml. of water sample, 10 ml. of 10 percent aqueous hydrazine reagent and 0.5 ml. of 0.5 percent aqueous cupric chloride and 2 percent of sulfuric acid with and without 3 percent of potassium persulfate. Each analysis required about 6 minutes. The reactor was calibrated and several samples were analyzed using the metal salt solution with and without the $K_2S_2O_8$ oxidant. Four analyses without $K_2S_2O_8$ indicated the mercury content of the water samples to be 60, 66, 67 and 54 p.p.b. With the $K_2S_2O_8$ oxidant in the metal salt solution, four analyses showed 99, 100, 98 and 100 p.p.b. of mercury compared to the known value of 100 p.p.b. of mercury.

Example II

Using the system shown in FIGS. 1 and 2 and the procedure described in Example I, samples of water containing 60 p.p.b. of methyl mercury chloride were analyzed. The metal reagent contained 0.5 percent of cupric chloride, 2 percent of sulfuric acid and 3 percent of potassium permanganate. Four analyses showed mercury contents of 62, 63. 61 and 61.5 p.p.b. of mercurry.

Example III

A system according to FIGS. 1 and 2 for analysis of mercury using the procedure described above was employed to analyze various samples of mercury sulfide suspended in water and containing 100 parts per billion of mercury. The metal reagent contained 0.5 percent of cupric chloride, 2 percent nitric acid and 3 percent of potassium permanganate. Four analyses showed mercury contents of 107, 102, 102 and 105.7 p.p.b. of mercury.

What is claimed is:

1. In a method for automatically monitoring a fluid for the content of mercury present therein by programming and mechanically performing successively and repetitively the operations of:
    (a) providing aqueous hydrazine reagent in a first reagent storage zone and a metal salt solution in a second reagent storage zone;
    (b) removing from said first reagent storage zone a hydrazine reagent portion of predetermined amount and transferring said hydrazine reagent portion to a scrubbing zone;
    (c) scrubbing said hydrazine reagent portion in said scrubbing zone with a gaseous carrier;
    (d) separating said gaseous carrier from the resulting aqueous mixture in said scrubbing zone;
    (e) transferring said carrier to a pyrolyzing zone and pyrolyzing said carrier and admixed components to remove interfering material from said gaseous carrier;
    (f) transferring said carrier to a measuring zone and automatically adjusting the base line reading to zero;
    (g) providing a fluid to be monitored for mercury therein;
    (h) removing from said fluid a sample of predetermined amount in a sample measuring zone;
    (i) transferring said sample to said srubbing zone;
    (j) scrubbing said sample with said aqueous mixture in said scrubbing zone with said carrier,
    (k) separating said gaseous carrier from the resulting aqueous liquid in said scrubbing zone;
    (l) transferring said carrier to said pyrolyzing zone and pyrolyzing said carrier and admixed components to remove interfering material from said gaseous carrier;
    (m) transferring said carrier to said measuring zone and photometrically measuring the quantity of mercury in said carrier;
    (n) indicating the quantity of mercury in said carrier relative to the predetermined amount of said sample, the improvement which comprises the steps of:
    (1) adding a mineral acid to said metal salt solution to form an acidified metal salt in said second reagent storage zone,
    (2) dissolving an oxidant for elementary mercury in said acidified metal salt solution;
    (3) transferring from said second reagent storage zone a portion of said acidified metal salt solution containing said dissolved oxidant to said sample measuring zone; and
    (4) mixing said sample of fluid with said portion in said sample measuring zone.

2. The method of claim 1 in which said metal salt is selected from the group consisting of the halides, sulfates and nitrates of nickel, cupric copper and titanous titanium.

3. The method of claim 2 in which said metal salt solution contains from 0.05 to 5 percent of said metal salt, from 0.05 to 5 percent of said mineral acid and from 0.05 to 5 percent of said oxidant.

4. The method of claim 3 in which said oxidant for elementary mercury is an alkali metal compound selected from the group consisting of alkali metal permanganates, alkali metal peroxides and alkali metal persulfates.

5. The method of claim 4 in which said alkali metal compound is potassium persulfate.

6. The method of claim 5 in which said mineral acid is sulfuric acid.

7. The method of claim 1 in which said carrier is heated in said pyrolyzing zone to a temperature of 500 to 1200° C.

8. The method of claim 1 in which said gaseous carrier is air.

9. The method of claim 1 in which the quantity of mercury vapor in said carrier is measured photometrically by radiating said mercury vapor with electromagnetic energy of wave length 2537 Angstrom units and measuring the amount of the energy absorbed at said wave length.

10. The method of claim 1 in which the quantity of mercury relative to the predetermined amount of said sample is additionally recorded.

11. The method of claim 1 in which each of a plurality of fluids are successively treated until the resulting photometric measurement for each passes a peak value and automatically switching to another sample of fluid until samples of all of said plurality of fluids are analyzed and then repeating the cycle.

12. In an apparatus for monitoring a fluid for the content of mercury present therein, wherein are provided:
   (a) programming means for mechanically activating and deactivating successively and repetitively;
   (b) means for removing from said fluid a sample of predetermined amount in a sample measuring zone;
   (c) means for circulating aqueous hydrazine reagent cyclically from a reagent storage zone through a reagent valve and through a reagent measuring zone and return to said reagent storage zone;
   (d) means for removing from said circulating hydrazine reagent a predetermined amount of said hydrazine reagent and for transferring said amount of hydrazine to said scrubbing zone;
   (e) means for scrubbing the mixture in said scrubbing zone with a gaseous carrier;
   (f) means for separating said gaseous carrier containing mercury vapor from the resulting aqueous liquid in said scrubbing zone;
   (g) means for transferring said carrier containing mercury vapor to a pyrolyzing zone to remove interfering materials from said gaseous carrier;
   (h) means for transferring the resulting purified gaseous carrier containing mercury vapor to a measuring zone;
   (i) photometric means for measuring the quantity of mercury in said carrier;
   (j) means for indicating the quantity of mercury in said carrier relative to the predetermined amount of said sample;
the improvement which comprises:
   (1) a storage zone for acidic metal salt reagent containing dissolved oxidant,
   (2) means for transferring a predetermined amount of said acidic metal salt reagent containing dissolved oxidant from said storage zone therefor to said sample measuring zone to form a mixture with said fluid sample; and
   (3) means for transferring said mixture from said sample measuring zone to a scrubbing zone.

13. The apparatus of claim 12 further including means for admixing and proportioning gaseous carrier with said predetermined amount of aqueous hydrazine reagent and for transferring the resulting mixture of said aqueous hydrazine reagent and said gaseous carrier to said scrubbing zone.

14. The apparatus of claim 13 which additionally incorporates means for recording the quantity of mercury in said carrier relative to the predetermined amount of said sample.

References Cited
UNITED STATES PATENTS
3,704,097   11/1972   Capuano _____ 23—253 R R. E. SERWIN, Primary Examiner U.S. Cl. X.R.

23—230 PC, 253 R, 253 PC